(12) United States Patent
Mueller et al.

(10) Patent No.: US 8,627,729 B2
(45) Date of Patent: Jan. 14, 2014

(54) METHOD FOR MANUFACTURING AN ULTRASONIC TRANSDUCER

(75) Inventors: Roland Mueller, Steinheim (DE); Gerhard Hueftle, Aspach (DE); Michael Horstbrink, Stuttgart-Feuerbach (DE); Tobias Lang, Stuttgart (DE); Sami Radwan, Stuttgart (DE); Bernd Kuenzl, Schwieberdingen (DE); Roland Wanja, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 669 days.

(21) Appl. No.: 12/640,806

(22) Filed: Dec. 17, 2009

(65) Prior Publication Data

US 2010/0154560 A1 Jun. 24, 2010

(30) Foreign Application Priority Data

Dec. 23, 2008 (DE) .......................... 10 2008 055 116

(51) Int. Cl.
*G01F 1/66* (2006.01)
*H01L 41/22* (2013.01)

(52) U.S. Cl.
USPC ..................................... 73/861.18; 29/25.35

(58) Field of Classification Search
USPC ...................... 73/861.18, 633, 644; 29/25.35; 310/336, 327, 335
See application file for complete search history.

(56) References Cited

U.S. PATENT DOCUMENTS

| | | | | | |
|---|---|---|---|---|---|
| 4,297,607 | A | * | 10/1981 | Lynnworth et al. | 310/334 |
| 4,346,505 | A | * | 8/1982 | Lemonon et al. | 29/25.35 |
| 4,523,122 | A | * | 6/1985 | Tone et al. | 310/334 |
| 5,297,553 | A | * | 3/1994 | Sliwa et al. | 600/459 |
| 5,744,898 | A | * | 4/1998 | Smith et al. | 310/334 |
| 6,111,339 | A | * | 8/2000 | Ohya et al. | 310/358 |
| 6,341,408 | B2 | * | 1/2002 | Bureau et al. | 29/25.35 |
| 6,522,051 | B1 | * | 2/2003 | Nguyen et al. | 310/336 |
| 6,764,637 | B2 | * | 7/2004 | Faulkner et al. | 264/444 |
| 7,459,836 | B2 | * | 12/2008 | Scott | 310/334 |
| 8,011,083 | B2 | * | 9/2011 | Straub et al. | 29/594 |

FOREIGN PATENT DOCUMENTS

| | | |
|---|---|---|
| DE | 42 30 773 | 2/1994 |
| DE | 10 2007 010 500 | 9/2008 |
| EP | 0 766 071 | 4/1997 |

OTHER PUBLICATIONS

M.I. Haller et al. : 1-3 *Composites for Ultrasonic Air Transducers*, IEEE 1992 Ultrasonics Symposium, 937 to 939.*

* cited by examiner

*Primary Examiner* — J M Saint Surin
(74) *Attorney, Agent, or Firm* — Kenyon & Kenyon LLP

(57) ABSTRACT

A method for manufacturing an ultrasonic transducer for use in a fluid medium. At least one piezoelectric transducer element is joined directly or indirectly to at least one matching member for promoting vibration coupling between the piezoelectric transducer element and the fluid medium. A matching member is used which has at least one porous molding of a polymer.

15 Claims, 1 Drawing Sheet

METHOD FOR MANUFACTURING AN ULTRASONIC TRANSDUCER

RELATED APPLICATION INFORMATION

The present application claims priority to and the benefit of German patent application no. 10 2008 055 116.3, which was filed in Germany on Dec. 23, 2008, the disclosure of which is incorporated herein by reference.

FIELD OF THE INVENTION

The present invention is directed to ultrasonic transducers which are used, for example, in ultrasonic flowmeters in process engineering and/or in the automotive sector.

BACKGROUND INFORMATION

Flowmeters may be used in the induction tract and/or exhaust tract of combustion engines for measuring volumetric flow, for measuring mass flow or for measuring velocity. Such ultrasonic transducers are provided especially for flow measurement in air; however, in principle, other fluid media, thus gases and/or liquids may also be used. In the automotive sector, air-quantity signals and/or air-mass signals may be derived from such an ultrasonic flow measurement within a system control of a combustion engine.

Ultrasonic transducers may be used which are able both to emit ultrasonic waves into a fluid medium and to receive ultrasonic waves from the fluid medium. In this context, ultrasonic signals are usually transmitted through the flowing fluid medium from an emitter to a receiver, and in so doing, propagation time, propagation-time differences, phases, phase differences or perhaps combinations of these and/or other measured quantities are recorded. These measured quantities or signals are influenced by the flow of the fluid medium. It is possible to infer the flow velocity of the fluid medium from the degree of the influencing of the propagation time. Various measuring systems and evaluation principles are possible, e.g., ultrasonic flowmeters having one, two or more ultrasonic transducers. Examples of ultrasonic transducers are discussed in DE 10 2007 010 500 A1, in DE 42 30 773 C1 and in EP 0 766 071 A1. The ultrasonic transducers discussed in this related art may also be modified according to the scope of the exemplary embodiments and/or exemplary methods of the present invention, so that, for example, reference may be made to these printed publications for possible embodiments.

However, one problem of many familiar ultrasonic flowmeters, at least when working with gaseous media, lies in comparatively low ultrasonic signal amplitudes. In particular, this is because the vibrational energy generated by customary ultrasonic generators, e.g., a piezoceramic, must overcome a high acoustic impedance difference, as a rule, approximately a factor of $6 \times 10^5$, during the coupling into the medium to be measured. Due to this, as a rule, approximately 99.9995% of the sound energy on the way from a piezoceramic into air is reflected back at the corresponding boundary surface, and is not usable for the measurement. The same reflection loss occurs again at the second receiving transducer element, which may also be identical to the first transducer element. In order to improve the acoustic coupling between the transducer element and the fluid medium to be measured, usually matching members are therefore used, e.g., in the form of one or more matching layers, which promote vibration coupling between the piezoelectric transducer element and the surrounding fluid medium. For instance, ultrasonic transducers are familiar which have sound-radiating resonance members or matching members, such as a metallic membrane or a /4-impedance-matching layer.

In M. I. Haller et al.: 1-3 *Composites for Ultrasonic Air Transducers*, IEEE 1992 Ultrasonics Symposium, 937 to 939, a matching member made of micromechanically produced Kapton® (a polyimide material by DuPont) is discussed. In that case, a column array of polyimide is produced with the aid of an oxygen plasma. However, the micromechanical method described there is technically extremely complex, and as a rule, is therefore not suitable for high-volume applications.

Ultrasonic transducers, particularly in the application areas indicated, must normally satisfy a multitude of boundary conditions. One important requirement is, in particular, a resistance of the ultrasonic transducers to media, especially with respect to the fluid media in which the ultrasonic transducers are intended to be used. Thus, for example, ultrasonic transducers should represent a robust ultrasonic air-mass measurement, e.g., as replacement for or addition to conventional thermal air-mass measurements, and should represent a key element for achieving tough exhaust-emission standards such as the EU6 exhaust-emission standard. However, for this purpose, the ultrasonic transducers must be usable in an induction atmosphere of a motor vehicle, for instance, in which they are exposed to environmental influences including moisture, oil, dust, fuels, exhaust components and/or further chemicals.

In addition, many ultrasonic transducers are used in areas in which the fluid medium is under high pressure. For example, they may be used in the induction tract downstream of turbochargers, and compressive loads of, for instance, 2 to 6 bar may occur. In order to ensure such media resistance and/or pressure resistance, the related art discusses ultrasonic transducers in which the sound-radiating surface or sound-receiving surface is an integral component of a transducer housing and/or of a flow pipe. The printed publications EP 0 766 071 A1 and DE 42 30 773 C1 cited above are examples thereof.

A further demand on customary ultrasonic transducers is thermal stability. Ultrasonic transducers can be used in very large temperature ranges. The encapsulation by a suitable housing described above offers a solution, at least to a great extent, with respect to this requirement, as well. However, in many cases, the encapsulation in a housing described in the related art gets into a conflict of aims with respect to a third requirement which must be fulfilled while at the same time maintaining the media/pressure resistance and the thermal stability, namely, the requirement with respect to suitable acoustic properties. On their part, these acoustic properties are subdivided into two requirements, namely, the requirement that there must be good coupling of the ultrasonic waves between the piezoelectric transducer element and the fluid medium, for which purpose, for example, one or more of the matching layers described above are used.

At the same time, however, there must be good decoupling with respect to the propagation of structure-borne noise in order, for example, to protect the piezoelectric transducer element from such structure-borne-noise propagation, e.g., via a flow pipe or sensor housing. This propagation of structure-borne noise may stem from external interference sources, or else be caused by the ultrasonic transducer currently transmitting, and may overlap in the currently receiving ultrasonic transducer with the sound transmitted through the fluid medium, and thus lead to measuring errors.

However, if the sound-radiating or sound-receiving surface of the ultrasonic transducers is an integral part of the transducer housing and/or of the flow pipe, then usually there is no such decoupling. Therefore, to decouple structure-borne noise, the related art frequently uses molded parts or potting areas made of elastomer materials, silicone materials, polyurethane materials, flexibilized epoxy materials or foamed materials. These decoupling materials are usually incorporated between the ultrasonic transducer and the flow pipe or sensor housing, and on their part, are exposed directly to the media. On their own, elastomers more resistant to media or moisture, like, for example, fluorinated materials, are in turn relatively hard, and therefore are only suitable for the decoupling when the transitions between the decoupling material and the transducer or flow pipe or sensor housing have a relatively small cross-sectional area like, for example, in the case of an O-ring which, in first approximation, permits a linear and therefore small transition region. However, such restrictions with regard to the geometry of the decoupling element lead to an unsatisfactory compromise with respect to decoupling efficacy and pressure resistance.

SUMMARY OF THE INVENTION

Therefore, ultrasonic transducers and methods for manufacturing ultrasonic transducers are proposed which, at least to a great extent, resolve the conflict of aims described above and are able to provide both media-resistant, pressure-resistant, thermally stable and acoustically suitable ultrasonic transducers. In a first aspect, a method is provided for producing an ultrasonic transducer for use in a fluid medium. In general, an ultrasonic transducer is described as an element which is able to emit acoustic signals in the ultrasonic range into a fluid medium and to receive acoustic signals from the fluid medium, and to convert them into corresponding electrical signals. On this matter, reference may be made, for example, to the related art cited above. A multitude of application possibilities exist with respect to the fluid medium, as well, gases and/or liquids being usable. Utilization in gaseous media, especially in air, particularly in an induction tract and/or exhaust tract of an internal combustion engine may be especially preferred. In this respect, the ultrasonic transducer may be used, for instance, in an ultrasonic flowmeter.

In the case of the method, at least one piezoelectric transducer element is joined directly or indirectly to at least one matching member for promoting vibration coupling between the piezoelectric transducer element and the fluid medium. In this context, the term piezoelectric transducer element is to be broadly understood, and includes, for example, electric-acoustic transducers which are able to operate according to ferroelectric, electrostatic, magnetostrictive, magnetoelectric effects or combinations of these effects. The matching member, which, in particular, may include one or more matching layers, exhibits an acoustic impedance which lies between that of the piezoelectric transducer element, e.g., of a piezo-material of the piezoelectric transducer element, and that of the fluid medium. Impedance matching may be brought about by the matching member, in doing which, for example, membranes and/or /4-layers may be used. For instance, reference may be made to the related art cited at the outset with respect to the matching layers and their function, as well.

For optimal impedance matching, the material or the material combination of the matching member would theoretically have to have an impedance which corresponds to the geometric mean of the impedances of the piezoelectric transducer element and of the fluid medium in order to optimally satisfy the acoustic requirements presented above. However, for what may particularly be the intended purpose, namely, the use of air as fluid medium, in many cases for typical sound velocities, unrealistically low values result from this for the density of the matching member or of the material used in the matching member, which as a rule would lead to materials that are not very robust. Therefore, according to the exemplary embodiments and/or exemplary methods of the present invention, a matching member is used which has at least one porous molding of a polymer. In particular, it has proven to be advantageous if this porous molding includes at least one polyimide, especially a polyimide which has no determinable glass transition temperature. For example, in this context, polyimides may be used which are available under the trade name "Vespel®" of DuPont. For instance, such polyimides without determinable glass transition temperature have the following chemical structure:

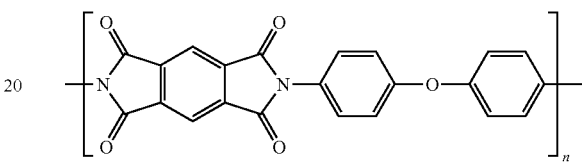

In this context, n denotes a whole number. Derivatives of the indicated polyimides may also be used, for example, derivatives in which hydrogens are replaced by substituents. Polyimides, especially the Vespel® indicated, have particularly low or no glass transitions and accordingly, are usable, for instance, in a high temperature range. Thus, for example, polyimides may be used in a temperature range below −100° C. and even in a temperature range above 300° C. In addition, polyimides generally have low thermal expansion coefficients compared to other plastics, so that the requirements with respect to thermal stability described above may also be satisfied well by the use of polyimides. In particular, stress of the piezoelectric transducer elements in response to rapid temperature changes may be reduced sharply. At the same time, polyimides normally have high media resistance, e.g., with respect to the environmental influences described above.

Simultaneously, by using a molding, a matching layer having relatively low acoustic impedance may be produced. The impedance may be influenced sharply and over a wide range by the porosity of the molding, so that, for instance, a stepwise impedance matching is also possible by using a plurality of moldings of different porosity, e.g., in a layer construction. It may particularly be the case, especially when using polyimide and, in particular, Vespel®, if the porous molding has a density between 0.6 und 1.0 $g/cm^3$, especially a density at approximately 0.8 $g/cm^3$. Such densities and the corresponding porosities or pore portions associated with them have turned out to be particularly suitable for the impedance matching, especially in a frequency range between 30 kHz and 400 kHz, e.g., in the range between 250 kHz and 300 kHz. For optimal impedance matching, the thickness of the moldings may be selected approximately as ¼ or ¾ of the ultrasonic wavelength lambda present in the material.

Depending on the measuring medium, the surrounding geometries and materials within the ultrasonic transducer and requirements with respect to response to temperature changes or spectral bandwidth, the indicated ¼ or ¾ lambda usually does not prove to be exactly the optimal thickness, so that a range of approximately 0.5 * to 2 * lambda proves to be suitable in principle. For example, a decrease in sound velocity together with rising temperature and corresponding decrease in amplitude may be counteracted and reversed in part by a somewhat reduced layer thickness of the molding.

Typically, the sound velocity in the material of the matching member may lie in a range from approximately 500 m/s to approximately 3000 m/s. In the case of porous polyimide, the sound velocity lies, for instance, in a range from approximately 500 m/s to approximately 1500 m/s. For example, porous moldings may be used which have a thickness between 0.5 mm and 1.5 mm, especially between 0.8 and 1.0 mm.

When working with porous moldings, in many cases there is the technical challenge that they take up media from the surroundings. However, this take-up of media, e.g., the take-up of fluid and or gaseous media as well as possibly a take-up of impurities, may lead to changes in the properties of the matching members. This problem arises particularly when the piezoelectric transducer element is joined to the matching member by a bonding process. In this case, for instance, adhesive agent may penetrate into the pores of the matching member or of the porous molding, which may impair the stability of the bond. On the other hand, penetrating substances may diminish the density-reduced area with the correspondingly reduced acoustic impedance, which means the effectively acting thickness of the matching member changes, and thus also its resonant frequency, and consequently the transfer characteristic of the ultrasonic transducer. However, constituents, e.g., impurities from the fluid medium may also enter the molding, which likewise may have an influence on the properties of this porous molding.

To meet this challenge, in one optional variant of the proposed method, at least one seal is introduced or applied, which is furnished to at least partially seal the porous molding. For instance, this seal may be applied on the porous molding or the matching member and at least partially cover it. However, in principle, an incomplete covering is possible, as well. Furthermore, alternatively or additionally, the seal may also not be applied directly on the matching member, e.g., the porous molding, but rather may merely seal it indirectly, for example, with respect to the fluid medium. For this purpose, a membrane may be used, for example. On the other hand, alternatively or additionally, in addition to sealing the porous molding, the seal may also be furnished in order to at least partially seal further elements of the ultrasonic transducer, e.g., a housing opening via which the piezoelectric transducer is able to exchange ultrasonic signals with the fluid medium. Decoupling elements, which may be used for the acoustic decoupling between the piezoelectric transducer element and the housing, may also be sealed. For example, such decoupling elements may have a Shore A hardness in the range of 10 to 60, e.g., at 25, but as a rule are not or are only poorly resistant to media.

On the other hand, alternatively or additionally, it is also possible to seal a damping element which brings the vibration of the piezo to rest as quickly as possible after a brief excitation, so that this potential source of structure-borne noise remains limited to a time period long enough before the received signal through the fluid. Thus, in addition to the porous molding, at least one such decoupling element or damping element may also be sealed, for example, with the aid of the proposed seal.

This seal may thus be realized in different ways. As described above, this seal is able, for example, to eliminate or at least reduce the problem of bonding between the piezoelectric transducer element and the porous molding. For this purpose, for example, the seal may be implemented in such a way that it seals at least one side of the porous molding or of the matching member facing the piezoelectric transducer element.

Alternatively or additionally, the problem of contamination described above, according to which the molding may be contaminated by the fluid medium, as well as the requirements for pressure tightness may also be resolved at least partially by the seal. Thus, as an alternative or in addition to a seal facing the piezoelectric transducer element, the seal may alternatively or additionally also be furnished to seal off at least one side of the porous molding facing the fluid medium. As indicated above, the sealing may be realized in various ways, in doing which, the sealing may also include different types of seals combined.

It may be particularly the case if, to produce the seal, at least one coating is applied, e.g., directly or indirectly on the porous molding and/or other of the above-described areas or elements of the ultrasonic transducer to be sealed. In so doing, for instance, the seal may at least partially cover at least one surface of the porous molding. A complete covering or sealing of this at least one surface or all surfaces of the porous molding is likewise conceivable.

Over and above the sealing purpose indicated, the seal may alternatively or additionally be used for other objectives, as well. Thus, for instance, the seal may bring about a matching of the thermal expansion coefficients, e.g., between the thermal expansion coefficient of the piezoelectric transducer element and the thermal expansion coefficient of the matching member. For example, the thermal expansion coefficient of the material of the piezoelectric transducer element may typically lie below 10 ppm/K. The thermal expansion coefficient of the porous molding of the matching member may lie, for example, at at least 20 ppm/K or above.

Accordingly, the seal may have a material whose thermal expansion coefficient lies between that of the piezoelectric transducer element and that of the matching member, particularly of the porous molding of the matching member. The thermal expansion coefficient of the seal may lie closer to that of the piezoelectric transducer element than to that of the matching member. Furthermore, the thickness of the seal in the direction pointing from the matching member to the piezoelectric transducer element may be selected so that thermomechanical aging of the piezoelectric transducer element is reduced to a desired extent. For example, this thickness may be at least 0.5 mm, which may be at least 1.0 mm, and which especially may be at least 1.5 mm.

The coating may feature at least one polymer coating, for instance. Such polymer coatings for sealing various elements are known in general from the related art. It may especially be the case if such polymer coatings are applied out of vacuum, since, in contrast to a liquid-phase deposition, for example, in this case contamination of the porous molding may be avoided. In this way, it is also possible to produce particularly impervious coatings, which especially beneficially ensure the sealing effect described above.

In particular, it is possible, for example, to apply Parylene in this way, so that it may especially be the case if the at least one coating is a coating containing Parylene and/or is produced completely from Parylene. Parylenes are inert, hydrophobic, polymer coating materials which, as a rule, may be applied by condensation from the vapor phase as non-porous polymer films onto a substrate. In general, within the scope of the exemplary embodiments and/or exemplary methods of the present invention, it may especially be the case if the optional polymer film which forms the coating or is a constituent of the coating is non-porous.

For example, Parylenes may be applied on virtually any substrate material. Starting material for producing Parylene coatings are di-para-xylylene or halogenated substituents of this material. They may be vaporized and conducted, for example, through a high-temperature zone. In so doing, a highly reactive monomer is able to form which is a diradical, and which is able to bring a reaction to completion to form a polymer on a surface of an object to be coated.

Alternatively or in addition to a coating, the seal may also include at least one film. For example, as presented above, this film may completely or partially cover the porous molding. Moreover, the film may also at the same time completely or partially cover or seal additional elements of the ultrasonic transducer. Thus, for example, a housing opening which faces the fluid medium may be sealed off by the at least one film. In this manner, for instance, a compressive strength may also be achieved, particularly when, due to a narrowing or an at least partial closure of the sensor housing on the side facing away from the fluid medium, it is ensured that the interior of the transducer is able to be supported in this area in response to compressive load, so that the film or the bond between the film and housing or between the film and matching member is stressed as little as possible.

Furthermore, at least one decoupling element or at least one damping element may also be protected by such a film and/or also by a coating, since such decoupling elements or damping elements, which are described in greater detail below, are usually not very resistant to media. The use of plastic films, e.g., again polyimide films, may be especially preferred. Thus, for instance, Kapton® films may be used in the seal. The use of polyimide films may prove to be particularly advantageous in conjunction with a polyimide molding, since, for example, thermal stresses may be reduced because of the similar material properties.

As already mentioned above several times, the ultrasonic transducer may further include at least one housing. Moreover, at least one decoupling element may be introduced between the housing and the matching member and/or the piezoelectric transducer element. In this context, decoupling elements are generally understood to be elements which are furnished to damp a transfer of structure-borne noise, in this case, a transfer of structure-borne noise between the housing and the matching member and/or the piezoelectric transducer element. It may be especially preferred if this decoupling element, which, for example, may be introduced in the form of a formed body and/or a coating and/or a filling into the housing, is relatively soft. For instance, the decoupling element may have a Shore A hardness of less than 60, which may be less than 25.

For example, liquid silicones, other kinds of silicones or other types of elastomers may be used for this purpose. Since, as described above, many of the materials suitable for the at least one decoupling element have generally low resistance to media, when a decoupling element is used, it may especially be the case if the optional sealing described above is applied in this case in such a way that it at least partially seals off the decoupling element with respect to the fluid medium. In this manner, the requirement described above with regard to the acoustic decoupling and the media resistance and/or pressure resistance may be satisfied particularly well.

In addition to the method described above in one or more of the specific embodiments described, an ultrasonic transducer is also proposed for use in a fluid medium which, in particular, is able to be produced or is produced according to the described method in one or more of the method variants described. In this respect, to a great extent, reference may be made to the above description for possible embodiments of the ultrasonic transducer. The ultrasonic transducer includes at least one piezoelectric transducer element and at least one matching member to promote vibration coupling between the piezoelectric transducer element and the fluid medium. Furthermore, the matching member includes at least one porous molding of a polymer.

Moreover, it was already explained above that, when producing the ultrasonic transducer, a problem may arise in the case of a direct bonding between the piezoelectric transducer element and the matching member. It was suggested there to introduce at least one seal between the piezoelectric transducer element and the matching member. This above-stated optional development of the method described above may also be used in the case of other types of matching members, which do not necessarily have to include a porous molding. Thus, an ultrasonic transducer is further proposed for use in a fluid medium, particularly an ultrasonic transducer according to the above description and/or produced or producible according to a method in accordance with one or more of the method variants described above, which has at least one piezoelectric transducer element and at least one matching member to promote vibration coupling between the piezoelectric transducer element and the fluid medium. At least one seal is introduced between the piezoelectric transducer element and the matching member, the seal being furnished to at least largely prevent penetration of adhesive agent into the matching member. Reference may be made to the above description with respect to the possible embodiment of the seal, e.g., as coating and/or as film. The matching member may again be porous, but may also be implemented in other ways. For example, reference may be made to the above description of the related art with respect to possible materials of the matching member. Plastic materials may be utilized, for instance, which have an impedance between the impedance of the piezoelectric transducer and of the fluid medium, e.g., the air. Examples are epoxide resins and/or polyester resins, e.g., with an admixture of hollow glass balls or the like. It is also possible to refer to other materials, known from the related art, for matching layers and/or matching members.

Overall, therefore, to resolve the conflict of aims described above with respect to satisfying the various demands, the exemplary embodiments and/or exemplary methods of the present invention thus provides measures which may be realized individually or perhaps in combination, and which, particularly in interaction, all in all provide increased media resistance and pressure resistance, high thermal stability and good acoustic properties.

The first measure described above represents the utilization of a porous molding of at least one polymer in the matching member, e.g., as a matching layer. For instance, it may be pressed, porous polyimide. This measure makes it possible to dispense with a costly micromechanical processing of the polyimide material, as is necessary, for example, in the case of the article by M. I. Haller et al. described above. Polyimide has a number of advantages with respect to the processing compared to conventional epoxide resin/hollow-glass-ball substances, and may be provided with customized impedance properties by suitable influencing of the pressing operation. In addition, because a glass transition is absent in the case of polyimide, the resonant frequency of the matching member changes less over the ultrasonic-transducer temperature range to be covered.

As a second measure usable alternatively or in combination, a seal was proposed, which may be realized according to one or more of the options described above. For example, a sealing layer may be disposed on the matching member on its side facing the piezoelectric transducer. However, in general, placement at other locations is possible as well. Disposing the seal between the matching member and the piezoelectric transducer, however, permits a larger range with respect to the selection of the matching-member material; for example, open-pored matching-member material may be sealed in a manner that adhesive agent from the bonding with the piezoelectric transducer element cannot or can only insignificantly seep into the matching-member material. Such a seepage would lead to a degradation of the bond and altered acoustic properties of the matching member, which may be avoided by the proposed seal.

As a third measure, which again may be utilized alternatively or in addition to the two previous measures, a seal may be applied in common over the matching member and a decoupling element and/or a damping element. For example, this seal may be implemented as a sealing layer, as a sealing film or as a combination of seals, as was described above. A common sealing layer may be used over the matching member and the decoupling and/or damping element, for instance, which in turn, may give rise to a greater breadth with respect to the material selection for the matching member, the damping element and the optional decoupling element. In this way, for example, the acoustic and/or thermal requirements may be taken into account in optimal fashion by suitable selection of material for the individual elements. In this case, such materials do not necessarily have to have good media resistance, since the fluid medium may be kept away completely from the matching member and/or the decoupling and/or damping element by the seal.

Exemplary embodiments of the present invention are shown in the drawings and explained in greater detail in the following description.

DETAILED DESCRIPTION

Figure 1:
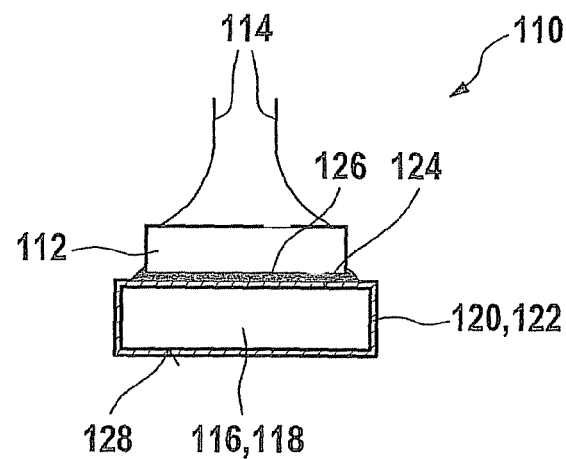
FIG. 1 shows a first exemplary embodiment of an ultrasonic transducer according to the present invention, having a matching member with a coating.
Figure 2:
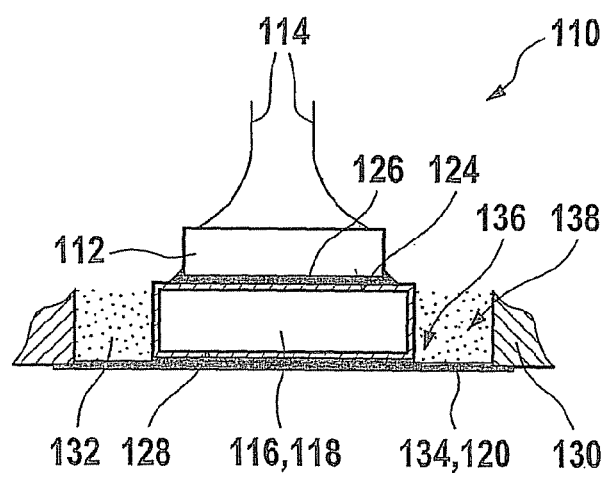
FIG. 2 shows a second exemplary embodiment of an ultrasonic transducer having a matching member with a coating, and having a sealing film.
Figure 3:
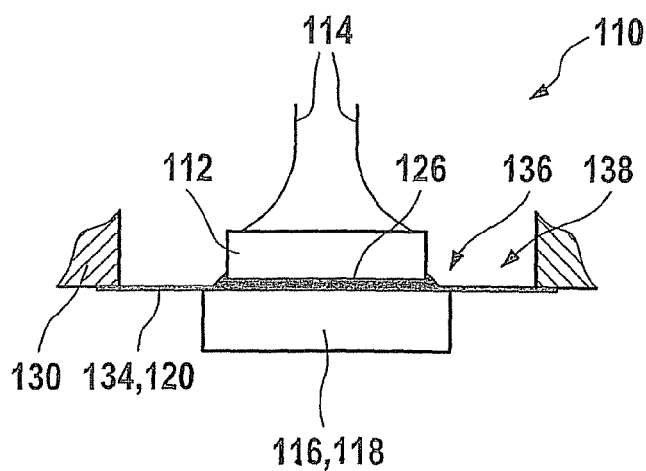
FIG. 3 shows a third exemplary embodiment of an ultrasonic transducer having a sealing film between a piezoelectric transducer and a matching member.

FIGS. 1 through 3 show various embodiments of an ultrasonic transducer 110 according to the exemplary embodiments and/or exemplary methods of the present invention. In each case, ultrasonic transducer 110 is shown in sectional view from the side in a highly schematized form. Over and above the elements shown, ultrasonic transducer 110 may include further elements not shown. In the three examples, ultrasonic transducer 110 in each case includes a piezoelectric transducer element 112 which, for example, may be electrically contacted via connection contacts 114 that are merely hinted at in the figures, in order to apply electric signals to piezoelectric transducer element 112 or to query electric signals of piezoelectric transducer element 112.

In the exemplary embodiments shown in FIGS. 1 through 3, in each case ultrasonic transducer 110 further includes a matching member 116, e.g., a matching member 116 made up of one or more matching layers. According to the exemplary embodiments and/or exemplary methods of the present invention, this matching member 116 is produced using a porous molding 118 of a polymer, hereinafter it being assumed—without limitation of possible further forms of the polymer—that it is a polyimide, particularly a polyimide without melting point and/or without determinable glass transition temperature. As described above, the use of Vespel®, which is available from DuPont, may be especially preferred.

However, it should be pointed out that, although particularly the exemplary embodiments according to FIGS. 2 and 3, namely, the use of a through-going sealing film (FIG. 2) and the use of a sealing film between piezoelectric transducer element 112 and matching member 116, as described above, are advantageous especially in conjunction with the use of a porous molding 118, in principle, they may also be realized independently of the use of a porous molding 118. Thus, for example, other materials known from the related art and usually used for matching member 116 may also be utilized. However, in the following, the invention is described with reference to a porous molding 118 of a polymer.

Moreover, in the exemplary embodiments according to FIGS. 1 through 3, in each case ultrasonic transducer 110 has a seal 120. However, the exemplary embodiments according to the figures differ in the form of this seal 120. Thus, in the exemplary embodiment according to FIGS. 1 and 2, seal 120 includes a coating 122, which here is represented as coating 122 completely enclosing matching member 116. However, in principle, an incomplete coating is possible as well. In the case shown in FIGS. 1 and 2, coating 122 is applied in particular on a surface 124 of matching member 116 facing piezoelectric transducer element 112. As described above, this coating 122 is thus able to prevent adhesive agent of a bonding 126 between piezoelectric transducer element 112 and matching member 116 from penetrating into the interior of matching member 116, which would impair bonding 126 in its properties and/or could influence the acoustic properties of matching member 116. Alternatively or additionally, a special adhesive agent may be used for bonding 126 whose viscosity is measured to be so high and/or curing time measured to be so short that as little adhesive agent as possible penetrates into the matching member. This adhesive agent may then take on the role of seal 120, or be combined with it. For example, such a special adhesive agent may be a UV-curing adhesive agent which undergoes a rapid precuring or complete curing by irradiation and therefore seals the matching member, and then optionally is completely cured under the influence of heat. Alternatively or additionally, such an adhesive agent may be hot-thixotropic, that is, may have a sufficiently high viscosity during the entire curing-temperature profile, so that the adhesive agent indeed closes and seals the pores of the matching member, but does not flow too far into the compensation member.

As likewise shown in FIGS. 1 and 2, coating 122 may also alternatively or additionally be disposed on a surface 128 which faces the fluid medium during operation of ultrasonic transducer 110. In this way, for example, contamination of matching member 116 from the fluid medium may be reduced or prevented.

Furthermore, all ultrasonic transducers 110 may have a housing 130. This housing 130 is only shown to some extent in FIGS. 2 and 3, however is omitted in FIG. 1. Naturally, however, a housing 130 may also be present in the exemplary embodiment according to FIG. 1. In the exemplary embodiment according to FIG. 2, as well as, optionally, in the remaining exemplary embodiments, at least one decoupling element 132 may further be provided, which is only shown in the exemplary embodiment according to FIG. 2. This decoupling element 132 is introduced between housing 130 and matching member 116 and/or piezoelectric transducer element 112, and reduces the transfer of structure-borne noise from housing 130 to piezoelectric transducer element 112 or matching member 116. For example, this decoupling element may have a potting, a molded article, a coating or a combination of the indicated elements and/or other elements. Decoupling element 132 may be produced, for instance, from a comparatively soft material, e.g., a material having a Shore A hardness of 25 or less. For example, decoupling element 132 may include a polyurethane, a silicone, a liquid silicone or the like. In addition, at least one damping element may be provided, which brings the piezoelectric transducer to rest as quickly as possible after an excitation of vibrations. For instance, it may include an epoxy material, a polyurethane or a silicone, and may contain further substances such as gaseous and/or solid filling agents.

In the exemplary embodiment according to FIG. 2, as an alternative or in addition to coating 122, seal 120 also includes a film 134. In the exemplary embodiment shown, this film 134 overstretches an entire opening 136 of housing 130 which faces the fluid medium. Thus, in the exemplary embodiment shown, film 134 completely or partially covers not only matching member 116, but also decoupling element 132 and/or the damping element. As described above, due to this sealing with the aid of film 134, materials which are not resistant to media may thus also be selected for decoupling element 132, i.e., the requirements with respect to the media resistance for these materials drop.

In the case of the exemplary embodiment of ultrasonic transducer 110 shown in FIG. 3 as well, a film 134 as seal 120 or as part of a seal 120 completely or at least partially covers opening 136 of housing 130. In this case, however, in contrast to the exemplary embodiment according to FIG. 2, piezoelectric transducer element 112 is separated from matching member 116 by film 134. As described above, the ability of the adhesive agent of bonding 126 to penetrate into matching member 116 may thereby be prevented. In contrast to the uncoated depiction according to FIG. 3, matching member 116 may also have a coating 122 in this exemplary embodiment, as well, e.g., analogous to FIGS. 1 and 2. Furthermore, analogous to the exemplary embodiment according to FIG. 2, at least one decoupling element 132 may again be introduced into housing 130, as well. Various embodiments are possible.

As described above, one aspect of the exemplary embodiments and/or exemplary methods of the present invention lies particularly in the use of a porous molding 118. For example, this porous molding 118 may include a polyimide polymer. Optionally, further substances may also be included which, for instance, are required during the process of manufacturing the molding. For example, experiments were carried out with a porous variant of the material Vespel® from the DuPont Co. This material is commercially available and is used, for instance, as high-temperature-resistant light construction material and/or as sealing material in aircraft engines. The material has excellent mechanical, thermal and acoustic properties. In contrast to the customary epoxide/hollow-glass-ball matching layers, Vespel® has no glass transition at which the material would soften. Vespel® is chemically absolutely inert and stable with respect to an extremely wide temperature application range, e.g., temperatures at less than −100° C. and more than 300° C.

On the other hand, depending on the manufacturing parameters, Vespel®—primarily in the density-reduced variant necessary for ultrasonic applications—is so open-pored that adhesive agent is able to seep into the material to the extent that either the bond exhibits a lower strength, or else the pores of matching member 116 would fill up to the point that the acoustic impedance would change too drastically. For this purpose, as described above, the different variants of seal 120, which are illustrated in FIGS. 1 through 3, may be utilized, so that the use of such seals 120 may be combined particularly well with porous moldings 118 made of polyimides, especially Vespel®. Penetration of moisture and/or aggressive constituents of the fluid medium, e.g., from an induction atmosphere of a motor vehicle, into the interior of ultrasonic transducer 110 and/or of the adjoining electronics may also be prevented by seal 120, e.g., by the seals according to FIGS. 2 and 3.

For use as acoustic impedance matching of a piezoceramic to air, the density of porous molding 118 may be adjusted in controlled manner by its manufacturing or pressing process. Since acoustic impedance Z is obtained as the product of the sound velocity and the density of the matching-member material, in this way the impedance may also be adjusted over a wide range. For plane, monospectral waves, an impedance in the geometric mean $Z_{match}=\sqrt{Z_{piezo} \cdot Z_{air}}$ between the impedance of the material of piezoelectric transducer element 112 ($Z_{Piezo}$) and the impedance of the fluid medium ($Z_{air}$), here air, would yield an optimal energy transfer, if matching member 116 has the thickness of one quarter wavelength (/4) of the acoustic waves. Alternative thicknesses for an optimal energy transfer are uneven multiples of the wavelength, though the corresponding resonances become spectrally ever narrower. However, for relatively short, spectrally broaderband ultrasonic pulses and realistic, three-dimensional dimensions of piezoelectric transducer element 112 and of matching member 116, the optimal impedance value and the optimal layer thickness of matching member 116 with respect to energy transfer and transducer bandwidth are to be selected completely differently, deviating from this calculation, particularly when an additional protective layer is used. For example, suitable target values may be ascertained empirically via prototypes with conventional epoxide/hollow-glass-ball materials, in comparison to different polyimide-material variants. An analytical or semi-analytical determination is also possible, e.g., as pointed out in the publication by M. I. Haller et al described above.

For cylindrical piezoelectric transducer elements 112 having dimensions of, e.g., 8 mm diameter and 2 mm thickness, as well as a radial resonant frequency on the order of 200 kHz, for example, density-reduced Vespel® wafers as porous moldings 118 having a density of approximately 0.8 g/cm$^3$ and a thickness of approximately 0.8 to 1.2 mm prove to be advantageous with respect to the acoustic demands. However, if a piezoceramic is stuck onto a Vespel® wafer, then, as described above, the adhesive agent may seep so far into the wafer that the stability of the bond becomes inadequate or the acoustic properties of matching member 116 can change too drastically. For this purpose, for example, prior to the bonding, the Vespel® wafer and/or matching member 116 implemented in other ways may be provided with coating 122, e.g., a Parylene coating. Such coatings, which may be applied from the vapor phase, e.g., with the aid of a CVD method (CVD: Chemical Vapor Deposition) are familiar to one skilled in the art. Due to such coatings 122 as part of seals 120, the adhesive agent of a bonding 126 is able to be retained on the surface of matching member 116.

As illustrated, for example, in FIGS. 1 and 2, coating 122, especially the Parylene coating, may also be used on the side or surface 128 of matching member 116 facing the fluid medium in order to seal the side off from aggressive media. As depicted in FIG. 2, for example, such a coating 122 or seal 120 may also extend beyond matching member 116. Thus, for example, this coating 122 or seal 120 may also at the same time completely or partially cover and thereby seal off piezoelectric transducer element 112 and/or a decoupling element 132 which is used, for instance, as a damping element. As described above, for most applications, the use of a decoupling element 132 requires a plastic having relatively low Shore hardnesses, e.g., Shore A hardnesses in the range between 25 and 30. However, as described above, such plastics, e.g., silicones, then usually exhibit little resistance to water, fuels or other constituents of a motor-vehicle induction atmosphere. The result, for instance, may be leakage, swelling, decomposition or a change in the acoustic/mechanical properties. On the other hand, in many cases, fluorinated silicones are too hard for an effective decoupling, and generally are only usable as molded parts. As a rule, however, separate molded parts in decoupling element 132 increase the costs and involve a more complex production, which means the risk may also develop that unwanted media will creep or diffuse past the molded part. On the other hand, an additional seal 120 in the form of a coating 122 and/or a film 134 as shown in FIG. 2 or 3, for example, permits the use of decoupling materials having little resistance, which, for instance, may be selected purely from the standpoint of acoustics and/or production. The term film 134 in this connection is to be viewed as a generalization of a coating 122, so that, for example, self-supporting films or also coatings 122 which are able to cover a plurality of components are to be included under this term.

Alternatively or in addition to a coating 122 made of Parylene, it is also possible to use Kapton®, for example. Kapton® or, to generalize, polyimides may again be used, e.g., in the form of one or more films 134. In this manner, as shown, for instance, in FIG. 2, matching member 116 and decoupling element 132 may be sealed together. Because of their chemical similarity, particularly with respect to thermal and/or thermomechanical properties, the combination of Vespel® and a Kapton® film may be especially advantageous. For example, if Kapton® is used as seal 120 and/or as a component of this seal 120, then this material, e.g., in the form of a film 134 in the application between piezoelectric transducer element 112 and matching member 116 shown in FIG. 3, may have a thickness of more than 100 m, because in this position, together with the piezoceramic of piezoelectric transducer element 112, there is no high impedance mismatch (impedance difference or faulty impedance matching). In contrast to that, in the case of the exemplary embodiment shown in FIG. 2, which may also be combined with a specific embodiment according to FIG. 3, film 134 should be comparatively thin and have, for example, a thickness of less than 50 µm, and which may be not more than 25 µm, so as not to ruin the acoustic impedance matching again.

On the other hand, if, as depicted in FIG. 2, for example, film 134 is to project beyond matching member 116 and, for instance, at the same time seal off a decoupling gap 138, filled with air and/or with decoupling element 132, between housing 130 and matching member 116 or piezoelectric transducer element 112, then, however, a film 134 of what may be less than 25 µm should be used at this place as well, since otherwise, there is the danger that an increased amount of structure-borne noise may be transferred via this film 134. For example, film 134, e.g., a Kapton® film and/or polyimide film, may be made self-adhering. Thus, for instance, prior to a bonding with matching member 116, such a film 134 may have been treated with an adhesive agent. Alternatively, however, film 134 may also be applied, for example, on matching member 116 and/or further elements of ultrasonic transducer 110 without an additional adhesive agent and without a coating 122, e.g., a Parylene coating.

As described above, the utilization of a seal 120, for example, a film 134 and/or a coating 122, e.g., using Kapton® and/or Parylene, may also be employed in the case of other types of matching members 116, as matching members 116 which use porous moldings 118. Thus, for instance, such seals 120 may also be employed advantageously in the case of epoxide/hollow-glass-ball matching members 116. As in FIG. 2, for example, seals 120 may also extend over additional elements of ultrasonic transducer 110, e.g., decoupling elements 132, in this case, as well.

Matching member 116, particularly a matching layer, may also be brought in the uncured state into contact with piezoelectric transducer element 112 and/or with seal 120, e.g., a film 134. In this case, seal 120 or film 134 may also be used as "an expendable mold" or as mold release agent, remaining on the component, for the material of matching member 116, and may also cover decoupling element 132 in ready-assembled ultrasonic transducer 110. In this way, it is possible to ensure a media-resistant transducer design.

Alternatively or in addition to the materials Parylene and/or Kapton® or polyimide indicated, seal 120, e.g., coating 122 and/or film 134, may also include other materials. Thus, for instance, alternatively or additionally, one or more lacquer layers and/or other types of plastics and/or metals, e.g., thin metal layers, may also be used. It may be that, as a rule, the radiation of the ultrasound into the fluid medium (e.g., air) and the irradiation of the ultrasound out of this fluid medium into ultrasonic transducer 110 ultimately takes place through seal 120 providing for the imperviousness and thus generally moving. However, this seal 120 itself is not to be understood as a resonant member or matching member 116, as is the case, for example, in transducers which, for instance, have a radiation layer that is fixedly joined to housing 130 and/or a flow pipe and that accomplishes a membrane resonance or thickness vibration for improved sound coupling. Therefore, seal 120 may be implemented fully as a component developed separately from housing 130. If seal 120 runs between piezoelectric transducer element 112 and matching member 116, as is the case in FIG. 3, for example, and extends from there over a decoupling element 132, then, for instance, the radiating surface of matching member 116 may be contoured particularly well. Thus, for example, the radiation characteristic may be influenced beneficially by chamfering. In addition, an electroconductive and/or conductively coated seal 120 mounted at this position may be utilized to electrically connect piezoelectric transducer element 112 via a conductive adhesive and via seal 120 to a metallic housing 130 and/or another lead.

In principle, housing 130 may be produced from any, of what may preferably be hard materials, e.g., plastics and/or metals. Housing 130 may also be covered completely or partially by seal 120. If ultrasonic transducer 110, e.g., in the form of housing 130, includes metallic materials, they may likewise be electrically insulated by seal 120 in the direction of the fluid medium, e.g., in the direction of the air, as well, provided seal 120 is non-conductive at least in this area. Electrically conductive housing parts and/or an electrically conductive protective layer in seal 120 may at the same time be used as an EMV measure, i.e., for electromagnetic shielding.

In addition to matching member 116 and seal 120, e.g., in the form of film 134 and/or of coating 122, ultrasonic transducer 110 may include further layers. Thus, for example, alternatively or additionally, at least one thermal/mechanical and/or acoustically acting compensating element or stabilizing element may be provided between seal 120, e.g., film 134 and/or coating 122, and piezoelectric transducer element 112, or between seal 120 and matching member 116. Furthermore, alternatively or additionally, ultrasonic transducer 110 may also be equipped with an additional damping element. For instance, a remaining interior space of housing 130 may be filled at least partially by a potting substance and/or a pressed-on elastomer. In this manner, for example, the ultrasonic transducer may be damped on the reverse side and/or radially.

What is claimed is:

1. A method for manufacturing an ultrasonic transducer for use in a fluid medium, the method comprising:
joining directly or indirectly at least one piezoelectric transducer element to at least one matching member for promoting vibration coupling between the at least one piezoelectric transducer element and the fluid medium;
wherein the at least one piezoelectric transducer element is bonded to the at least one matching member by an adhesive agent,
wherein the at least one matching member has at least one porous molding of a polymer,
wherein the polymer includes at least one polyimide,
wherein at least one seal is applied, and wherein the seal at least partially seals a side of the at least one porous molding facing the piezoelectric transducer element,
wherein the seal is provided to at least largely prevent the adhesive agent from penetrating into the at least one matching member.

2. The method of claim 1, wherein the porous molding has a density between 0.6 and 1.0 g/cm3.

3. The method of claim 1, wherein the porous molding has a thickness which amounts to at least approximately ¼ of the ultrasonic wavelength in the porous molding.

4. The method of claim 1, wherein the seal at least partially seals the porous molding.

5. The method of claim 4, wherein the seal at least partially seals at least one side of the porous molding facing the fluid medium.

6. The method of claim 4, wherein at least one coating is applied to produce the seal, and wherein the coating at least partially covers at least one surface of the porous molding.

7. The method of claim 6, wherein the coating has at least one polymer coating applied in a vacuum.

8. The method of claim 6, wherein the coating has at least one polymer coating applied in a vacuum, and wherein the coating contains Parylene.

9. The method of claim 4, wherein the seal includes at least one film, particularly at least one plastic film, especially at least one polyimide film.

10. The method of claim 4, wherein the seal includes at least one plastic film.

11. The method of claim 4, wherein the seal includes at least one polyimide film.

12. The method of claim 1, wherein the polymer includes at least one polyimide, and wherein the polyimide is a polyimide which has no determinable glass transition temperature.

13. The method of claim 1, wherein the porous molding has a density between 0.6 and 0.8 g/cm3.

14. The method of claim 1, wherein the porous molding has a thickness which amounts to at least approximately ¾ of the ultrasonic wavelength in the porous molding.

15. A method for manufacturing an ultrasonic transducer for use in a fluid medium, the method comprising:
joining directly or indirectly at least one piezoelectric transducer element to at least one matching member for promoting vibration coupling between the at least one piezoelectric transducer element and the fluid medium;
wherein the at least one matching member has at least one porous molding of a polymer,
wherein: the ultrasonic transducer includes (i) at least one housing, and (ii) at least one of a decoupling element and a damping element, which are between the housing and at least one of the matching member and the piezoelectric transducer element,
at least one of the decoupling element and the damping element are provided to damp a transfer of a structure-borne noise between the housing and at least one of the matching member and the piezoelectric transducer element, and
the seal is applied so that it at least partially seals at least one of the decoupling element and the damping element with respect to the fluid medium.

* * * * *